United States Patent [19]

Nicholls et al.

[11] Patent Number: 5,453,121
[45] Date of Patent: Sep. 26, 1995

[54] LIQUID INK JET INK

[75] Inventors: Stephen L. Nicholls, Willunga; John T. Alston, Wynn Vale, both of Australia

[73] Assignee: Tonejet Corporation Pty Ltd., Eastwood, Australia

[21] Appl. No.: 268,514

[22] Filed: Jun. 30, 1994

[30] Foreign Application Priority Data

Jul. 1, 1993 [AU] Australia ............... PL9710

[51] Int. Cl.⁶ ............................................. C09D 11/02
[52] U.S. Cl. .................. 106/20 B; 106/22 B; 106/22 C; 106/23 B; 106/23 C
[58] Field of Search ............... 106/21 A, 21 E, 106/23 B, 23 C, 20 B, 22 B, 22 C

[56] References Cited

U.S. PATENT DOCUMENTS

| 3,846,140 | 11/1974 | Youtsey et al. | 106/23 C |
| 4,502,054 | 3/1985 | Brescia et al. | 346/7.5 |
| 4,663,264 | 5/1987 | Mitchell | 106/23 B |
| 4,734,352 | 3/1988 | Mitchell | 106/23 B |
| 5,328,504 | 7/1994 | Ohnishi | 106/23 C |

FOREIGN PATENT DOCUMENTS

WO93/11866  6/1993  WIPO.

*Primary Examiner*—Helene Klemanski
*Attorney, Agent, or Firm*—Evenson, McKeown, Edwards & Lenaham

[57] ABSTRACT

An ink jet ink composition comprising a liquid having an electrical resistance of at least $10^9$ Ohm.cm, insoluble marking particles in a range of from 0.5% to 30% by weight and a particle charging agent in a range of from 0.05 to 5% by weight, where the marking particles are capable of being charged and concentrated into agglomerations of the particles and ejected from the ink in the presence of non-uniform electrostatic field of significant gradient in an ink jet printing apparatus.

13 Claims, No Drawings

LIQUID INK JET INK

FIELD OF THE INVENTION

This invention relates to inks and more particularly to inks suitable for ink jet printing apparatus.

BACKGROUND OF THE INVENTION

Inks are generally a liquid with a dye dissolved in them. Inks are also known which comprise a liquid and particles dispersed in the ink. The actual composition of machine inks as distinct from writing inks is determined by the type of application method for such inks.

There are two prime types of ink jet application techniques in use today. The first of these is known as continuous ink jet and the second is impulse ink jet.

In continuous ink jet systems, droplets of ink are produced as a result of hydrostatic pressure on a liquid ink forcing said ink through a nozzle. The nozzle can be stimulated, such as by piezo-electric vibration to cause the droplets to be ejected on a regular basis. At the point of formation, the droplets may be conductively and/or electrochemically charged and subsequently pass through electrodes which provide a constant electrostatic field causing these droplets to be deflected. Therefore the required droplets are controlled to a substrate and unwanted ones are removed. Due to the charging requirements it is necessary that the ink be conductive. Such an ink may be water or solvent based and the colorant may be a pigment or soluble dye.

In the impulse ink jet system, droplets are produced only as required by the generation of a pressure disturbance within the ink adjacent to a jet nozzle. The application of pressure may be by stimulation caused by a piezo-electric crystal or by thermal stimulation where a micro bubble is created by an electrically resistive heater. Typical inks are water based and use a dye for the colorant though the use of solvents and pigments are not precluded for this process. As there is no need for droplet charging there is no specific requirement concerning conductivity of the ink.

A further embodiment of the impulse system is hot melt ink jet technology. This process is similar to the piezo-electric drop on demand except that the ink is solid at room temperature but is maintained at an elevated temperature in the print head such that it is a liquid under operating conditions. Again therefore, there is no need for the ink's conductivity to be suited to some equipment performance standard.

A final system that utilises small electromechanical valves to produce droplets is known as the valve jet process. This is in essence a micro spray gun system and produces much larger droplets than the true ink jet technologies. As the droplets are produced mechanically there is no requirement concerning the conductivity of the ink.

The preceding technologies are limited in terms of achievable resolution due to droplet formation being a function of the jet nozzle diameter. The smallest nozzles used have diameter in the range of 7.5 to 10 micrometers which produce droplets of the order of 14 to 20 micrometers and this translates to a dot size of 30 to 40 micrometers on selected papers. Further, the inks used in these small nozzle jet printers are based on water soluble dyes, as pigment based inks cause problems with nozzle blocking. Therefore the advantages of pigment formulations, namely better waterfastness and lightfastness as well as a broader range of available colours, are precluded.

Electrostatic ink jet is a further technology which is characterised by droplets being drawn from an orifice under the influence of an electrostatic field. This field acting between a valving electrode and the orifice, attracts free charges within the ink to its surface such that a droplet is produced when the electrostatic pull exceeds the surface tension of the ink. As this technique relies on attraction of free charges, it therefore requires that the ink be conductive.

A new ink jet printing technology has been described in WO-A-9311866 in the name of Research Laboratories Of Australia published on the 24 th of June 1993. This process provides a means of producing variable sized droplets that contain a high concentration of particulate material.

Specific advantages conveyed by this process include the ability to form droplets as small as a few micrometers while still using pigments as the colorant material. This is because the size of the droplets are controlled primarily by the voltage on an ejection point plus the ability of the particles to be charged and so, are not limited by the size of an ink jet nozzle. Also the colorant material is significantly concentrated in the ejected droplets. Therefore high resolution and high density images based on light and water resistant pigments can be produced.

SUMMARY OF THE INVENTION

This present invention is in relation to an ink that can be used with the new ink jet printing technology outlined above where the ejected droplets formed are substantially solid colorant and comprise only a small amount of a liquid. Specifically the ink has characteristics that are essential for the concentration of the colorant material at the point of droplet ejection. The various inks discussed in the prior art cannot produce droplets of ink which are substantially all colorant because of the necessity of having a liquid or solvent which transfers with the colorant. Hence these arrangements have a limitation producing a high intensity marking droplet.

The ink jet ink of the present invention also has properties that are readily utilised for the production of high resolution marking. This results in part from the intrinsically small droplets produced by the jet printer and a reduced tendency for wicking and bleeding due to the concentration of colorant particles within the droplets.

It is an object of this invention to produce an ink jet ink which can give a high intensity marking or at least to provide an alternative ink for ink jet printing.

A further object of the invention is to provide an ink jet ink that can be used for high resolution marking.

It is yet another object to provide an ink jet ink that has a minimal tendency to wick or bleed.

This invention will be discussed generally in relation to printing with inks but it is to be realised that the invention is not so limited but can be used for a number of applications in which it is required to apply or administer fine particulate material which can be supported in a liquid.

In one form therefore the invention is said to reside in an ink jet ink comprising a liquid having an electrical resistance of at least $10^9$ ohm.cm, and insoluble marking particles dispersed in the liquid, wherein said particles are capable of being charged and concentrated into agglomerations and ejected from the ink in an ink jet apparatus in the presence of electrostatic field of significant gradient.

In an alternative form the invention may be said to reside in an ink jet ink composition comprising;

(a) a liquid having an electrical resistance of at least $10^9$ ohm.cm, (b) insoluble chargeable marking particles, and (c) a particle charging agent.

The liquid may be an aliphatic hydrocarbon, an aromatic hydrocarbon, a chlorinated solvent or mixture thereof, a polysiloxane or a vegetable oil.

The marking particle may be a pigment, an insoluble dyestuff, a polymer or mixture thereof or it may be a pharmaceutical and may be present in a concentration of from 0.5% to 30% by weight, preferably 3% to 20%. It is surprising that an ink jet ink with such a high solids content can be successfully used, thereby reducing formulation and storage costs and allowing the use of smaller tanks, pumps and cartridges for a given solids content.

The particle charging agent may be a metal soap, a fatty acid, lecithin, an organic phosphorus compound, a succinimide, a sulphosuccinate or a mixture thereof. Alternatively the particle charging agent may be a soluble or partially soluble resin such as a modified rosin ester, an acrylic, a vinyl, a hydrocarbon or a mixture thereof. The particle charging agent may be present in a concentration of from 0.05% to 5% by weight and a preferred range of from 0.1% to 1% by weight.

DESCRIPTION OF PREFERRED EMBODIMENTS

The present invention provides for an ink that comprises marking particles that are dispersed in a liquid which has an electrical resistance of at least $10^9$ ohm.cm. In addition the ink contains particle charging agents.

The liquid may be any suitable liquid with the characteristics as discussed above and may include aliphatic hydrocarbons such as hexane, cyclohexane, iso-decane, ISOPAR (an isoparaffinic hydrocarbon manufactured by Exxon; and SHELLSOL T (an aliphatic hydrocarbon manufactured by Shell); aromatic hydrocarbons such as xylene, toluene and SOLVESSO 100 (an aromatic hydrocarbon manufactured by Exxon); chlorinated solvents such as diethylene chloride and chloroform; silicone fluids or oils such as dimethyl polysiloxane, for instance DC 200 (manufactured by Dow Corning) and cyclic dimethyl polysiloxane, for instance DC 345 (manufactured by Dow Corning) and vegetable oils such as olive, safflower, sunflower, soya and linseed oil.

Marking particles that are insoluble in the liquid may be selected upon their particular proposed end use and may be made from a wide range of colorants, polymers and chemicals or mixtures thereof. Examples of colorants suitable for use in the ink are organic pigments such as pigment yellow 1, pigment yellow 14, pigment red 48:2, pigment red 122, pigment blue 15:3 and pigment blue 56; inorganic pigments such as pigment white 6, pigment yellow 35, pigment blue 27, pigment black 7 and pigment black 11; solvent dyes such as solvent red 7, solvent yellow 88, solvent blue 49, basic red 1 and basic blue 26 and metallic pigments such pigment metal 1 and pigment metal 2.

Examples of polymers suitable for use in the ink as particles are epoxy resins such as bisphenol A epoxy, novolac epoxy and cycloaliphatic epoxy; acrylic resins such as polymers and copolymers of acrylic acid and esters thereof, polymers and copolymers of methacrylic acid and esters thereof; vinyl resins such as polymers and copolymers including vinyl acetate, vinyl chloride, vinyl alcohol and vinyl butyral; alkyd resins such as oil, phenolic and rosin modified alkyds and finally modified rosin esters such as dimerised pentaerythritol rosin ester. These polymers may be dyed or include pigments dispersed therewith.

Examples of chemicals suitable for use as the ink particles are pharmaceuticals such as acetyl salicylic Acid, sucrose and ascorbic acid, agricultural chemicals such as copper oxychloride and elemental sulphur and industrial chemicals. The marking particles may be present in a concentration of from 0.5% to 30% by weight of the composition.

In addition, resins and polymers that are soluble or partially soluble may be used to disperse the marking particles in the liquid and to function as a binder for said marking particles to a substrate. Examples of suitable resins include certain modified rosin esters, acrylic resins and vinyl resins that are similar to those listed above except that these have larger alkyl groups which impart the solubility in the liquid. In addition hydrocarbon resins such as alpha methyl styrene and polyisobutylene are also suitable.

The particle charging agent may be any material that is soluble or partly soluble in the liquid and that assists in the charging process. Examples of such agents include metal soaps such as lithium, cadmium, calcium, manganese and magnesium salts of heptanoic acid as well as zirconium, aluminium, cobalt and manganese salts of 2-ethyl hexanoic acid; fatty acids; lecithin; organic phosphorus compounds; succinimides; sulphosuccinates such as sodium dihexyl sulphosuccinate and sodium dioctyl sulphosuccinate and polar solvents such as alcohols, ketones and esters. Also the previously mentioned soluble polymers and resins that provide the particle dispersion and binder functions have been found to contribute to charge modification. It is important that the quantity of said agents added to the formulation does not decrease the electrical resistance of the ink beyond the limit of $10^9$ ohm.cm. The action of such particle charging agents in the ink is not fully understood but it is believed that they assist with charging of the particles to assist with the formation of agglomerations of charged particles in the non-conductive liquid in the presence of a non-uniform electrostatic field of significant gradient on or about an ejection location. The particle charging agent may be present in a concentration of from 0.05% to 5% by weight of the composition.

The ink jet ink according to the present invention may be prepared by dispersing the said marking particles and other aforementioned components into the liquid. A variety of processes can be employed for the preparation of the ink including ball mills, attritors, colloid mills, three-roll mills, pearl mills and high speed dispersers. Alternatively the particles may be formed by polymerisation of the particles in the liquid.

Examples of applications for the ink according to this invention are diverse and include office printers, component marking, magnetic ink character recognition, to mark integrated circuits, to mark glass, plastic and ceramics, to mark metals and alloys, food stuffs marking, textile printing and the making of printing plates to function as an offset master. It will be realised that the proposed end use will determine the selection of the various components.

The ink composition of the present invention may also be used for the administration of pharmaceuticals either directly into an animal or human or onto a substrate such as an inert tablet where it is desired to apply an exact amount of the pharmaceutical.

This then generally describes the invention but to assist with understanding the invention reference will now be made to examples of ink formulations.

EXAMPLE 1

| ISOPAR L | 420 g |
|---|---|
| 2-ethyl hexyl acrylate | 30 g |
| vinyl acetate | 150 g |
| azo-iso-butyronitrile | 2 g |

The above ingredients were heated under reflux conditions to effect the polymerisation of a poly (vinyl acetate/2-ethyl hexyl acrylate) co-polymer.

To 200 g of this white resinous solution was then added the following:

| Microlith Black CT | 24 g |
|---|---|
| Microlith Blue 4GT | 6 g |
| Nuodex Zirconium 6% | 5 g |
| Isopar G | 200 g |

ISOPAR G and ISOPAR L are isoparaffinic solvents made by Exxon Chemical.

Microlith Black CT is a CI Pigment Black 7 made by Ciba-Geigy. Microlith Blue 4GT a CI Pigment Blue 15:3 made by Ciba-Geigy. Nuodex Zirconium 6% is a zirconium octoate nade by Hüls America Inc.

This mixture was milled in a ball jar for 3 days to form a black ink with a marking particle content of 19%, a particle charging agent content of 1.1% and an electrical resistivity of $10^{11}$ ohm.cm.

This heat fixing ink was used in the ink jet printing device described in WO-A-9311866 image copy brand paper where it gave a printed dot size of 200 micrometers at a frequency of 300 Hz, the optical density being 1.8 odu as measured with a Gretag D186 densitometer.

EXAMPLE 2

| Graphtol Rubine BDO | 20 g |
|---|---|
| 2-propanol | 5 g |
| Nuodex Zirconium 6% | 10 g |
| ISOPAR G | 465 g |

Graphtol Rubine BDO is a CI Pigment Red 57 made by Sandoz.

The above ingredients were added to a ball jar and milled for 3 days to prepare a red ink with a marking particle content of 4%, a particle charging agent content of 2% and an electrical resistance of $10^{11}$ ohm.cm. This ink was used in the ink jet printing device described in WO-A-9311866 to image copy bond paper where it gave 100 micron dots at a frequency of 2 kHz with excellent circularity.

EXAMPLE 3

| Irgalite Blue LGLD | 3 g |
|---|---|
| Picotex LC | 60 g |
| Nuodex Zirconium 6% | 2 g |
| ISOPAR G | 535 g |

Irgalite Blue LGLD (CI Pigment Blue 15:3) is made by Ciba Geigy. Piccotex LC is an methyl styrene made by Hercules Inc.

The above ingredients were added to a ball jar and milled for 2 days to prepare a blue ink with a solids content of 0.5%, a particle charging agent content of 0.3% and an electrical resistance of $10^{11}$ ohm.cm. This ink was used in the ink jet printing device described in WO-A-9311866 to image copy bond paper where it gave 50 micron dots at a frequency of 5 kHz. The resultant image showed excellent resolution and good adhesion to the paper.

EXAMPLE 4

| ISOPAR L | 80 g |
|---|---|
| zinc oxide | 1 g |
| Piccotex LC | 20 g |
| Nuodex Zirconium 6% | 0.1 g |

Piccotex LC is an methyl styrene made by Hercules Inc.

The above ingredients were added to a ball jar and milled for 4 days to prepare a white ink suitable for certain marking applications. The ink had a marking particle content of 1%, a particle charging agent content of 0.1% and an electrical resistance of $10^{11}$ ohm.cm. This ink was used to generate an image on an integrated circuit where it produced good optical density. The ink also displayed adequate fix without the use of additional heating which is significant as such heating could well cause the corruption of information contained on the integrated circuit.

EXAMPLE 5

| ISOPAR G | 500 g |
|---|---|
| 2-ethyl hexyl acrylate | 50 g |
| vinyl acetate | 150 g |
| benzoyl peroxide | 1 g |

The above ingredients were heated under reflux conditions to effect the polymerisation of a poly (vinyl acetate/2-ethyl hexyl acrylate) co-polymer. To this white resinous solution was then added the following:

| Orasol Black RL | 2 g |
|---|---|
| Manganese 56% | 5 g |

Orasol Black RL (CI Solvent Black 29) made by Ciba-Geigy. Manganese 56% is a manganese naphthenate made by A. C. Hatrick Chemicals.

A black ink with a marking particle content of 28%, a particle charging agent content of 0.7% and an electrical resistance of $10^{10}$ ohm.cm. was so formed which exhibited good dispersion stability. This ink was used in the ink jet printing device described in WO-A-9311866 to image copy bond paper. The image was of low density and showed very good fix to the paper.

EXAMPLE 6

| sunflower oil | 194 g |
|---|---|
| Microlith Blue 4GT | 3 g |
| polyethylene wax | 1 g |
| Elvax 210 | 1 g |
| Nuodex Zirconium 6% | 1 g |

Elvax 210 is an ethylene-vinyl acetate made by E. I. DuPont & Co.

Ingredients were milled in a heated attritor for 3 hours to prepare a blue ink with a marking particle content of 2%, a particle charging agent content of 0.5% and an electrical resistance of $10^{11}$ ohm.cm. The ink formed may be used for the direct marking of food stuffs (only as permitted by relevant safety authorities). This ink was used in the ink jet printing device described in WO-A-9311866 to print onto confectionery where good image quality and optical density was achieved.

EXAMPLE 7

| Magnox B350 | 200 g |
| --- | --- |
| Mogul L | 20 g |
| Synthetic Resin SK | 400 g |

The above materials were mixed together in a hot melt blender to form a solid pigment dispersion. 100 g of this pigment and resin composite was then milled for 5 days with the following materials:

| Plexol 917 | 10 g |
| --- | --- |
| Nuodex Zirconium 6% | 10 g |
| ISOPAR G | 400 g |

Magnox B350 is a magnetic iron oxide made by Magnox Inc. Synthetic Resin SK is a modified ketone resin made by Chemishe Werke Huls.

Mogul L is a CI Pigment Black 7 made by Cabot Corporation. Plexol 917 is a gear oil additive made by Rohm & Haas.

This ink concentrate was diluted 20 fold in Isopar G to form an ink dispersion suitable for use in magnetic ink character recognition (MICR) applications. The ink had a marking particle content of 1.9%, a particle charging agent content of 1.1% and an electrical resistance of $10^{10}$ ohm.cm. The ink was used to generate characters on bond paper which were analysed using a magnetic character recognition tester namely an Atlantic/Force Codatest-SST. The determined magnetic response easily met the USA Standard E-13B.

EXAMPLE 8

| DC 200 Fluid 1 cs | 500 g |
| --- | --- |
| Araldite 6084 | 200 g |
| Irgalite Blue LGLD | 20 g |
| Nuodex Zirconium 6% | 2 g |

Araldite 6084 is an epoxy resin made by Ciba-Geigy. DC 200 Fluid is a silicone oil made by Dow Corning.

The above ingredients were added to a ball jar and milled for 4 days to prepare a blue resinous ink. The ink concentrate so formed was diluted 10-fold in silicone fluid (1 mPa.s) to produce a thermoplastic ink dispersion with a marking particle content of 3%, a particle charging agent content of 0.3% and an electrical resistance of $10^{11}$ ohm.cm.

The said jet ink printing device was used to image an Agfa CRAA alumina printing plate which was then fused at 110° C. for 2 minutes. The plate was printed using an AM 1250 duplicator and gave 50,000 good copies.

EXAMPLE 9

| Tintacarb 300 | 8.5 g |
| --- | --- |
| Reflex Blue 3G | 1.5 g |
| FOA-2 | 13.5 g |
| Nuodex Zirconium 6% | 4.0 g |
| ISOPAR L | 372.5 g |

Tintacarb 300 is a CI Pigment Black 7 made by Cabot Corporation. Reflex Blue 3G is a CI Pigment Blue 56 made by Hoechst Ltd. FOA-2 is a styrene methacrylate terpolymer made by DuPont.

The above ingredients were added to a ball jar and milled for 2 days to prepare a black ink with a marking particle content of 2.5%, a particle charging agent content of 4.4% and an electrical resistance of $10^9$ ohm.cm. The FOA-2 polymer used in this ink acts as a particle charging agent in combination with the metal soap zirconium octoate. This ink was used in the ink jet printing device described in WO-A-9311866 to image copy bond paper where it gave 20 micron dots at a very high frequency of 34.5 kHz.

EXAMPLE 10

| Kayanol Milling Blue 2RW | 20 g |
| --- | --- |
| Acryloid 958 | 10 g |
| ISOPAR G | 170 g |

Kayanol Milling Blue 2RW is an Acid Blue 140 made by Nippon Kayaku Co.

Acryloid 958 is a polymeric oil additive made by Rohm & Haas.

The above ingredients were added to a ball jar and milled for 3 days to prepare an ink concentrate. This was then diluted 20 fold in Isopar G to prepare a blue ink dispersion with a marking particle content of 0.5%, a particle charging agent content of 0.25% and an electrical resistance of $10^{11}$ ohm.cm. This ink was used in the ink jet printing device described in WO-A-9311866 to image silk fabric. The printed material so formed was then treated with steam to fix the acid dyestuff to the silk, thereby forming a high density, waterfast image with good resolution.

It will be seen that by this invention there is produced an ink jet ink which is distinctly different from other inks and which is particularly useful for novel ink jet applications.

We claim:

1. An ink jet composition comprising:
   (a) a liquid having an electrical resistance of at least $10^9$ ohm.cm,
   (b) insoluble chargeable marking particles in a range of from 0.5% to 30% by weight of the composition, and
   (c) a particle charging agent in a range of from 0.05% to 5% by weight of the composition.

2. An ink jet ink composition as in claim 1 wherein the marking particles are present in a range of from 3% to 20% by weight of the composition.

3. An ink jet ink composition as in claim 1 wherein the particle charging agent is present in a range of from 0.1% to 1% by weight of the composition.

4. An ink jet ink composition as in claim 1 wherein the liquid is selected from the group of aliphatic hydrocarbons, aromatic hydrocarbons, chlorinated solvents, polysiloxanes or mixtures thereof or is a vegetable oil selected from olive oil, safflower oil, sunflower oil, soya oil and linseed oil or mixtures thereof.

5. An ink jet ink composition as in claim 1 wherein the marking particle is a pigment, an insoluble dyestuff, a pharmaceutical, a polymer or a mixture thereof.

6. An ink jet ink composition as in claim 1 wherein the particle charging agent is a metal soap, a fatty acid, lecithin, an organic phosphorus compound, a succinimide, a sulphosuccinate or a mixture thereof.

7. An ink jet ink composition as in claim 1 wherein the particle charging agent is a soluble or partially soluble resin such as a modified rosin ester, an acrylic, a vinyl, a hydrocarbon or a mixture thereof.

8. An ink jet ink composition as in claim 1 further including a resin binder selected from modified rosin esters, acrylic resins and vinyl resins, alpha methyl styrene and polyisobutylene.

9. A method of printing an image onto a substrate which comprises jetting an ink jet ink composition as in claim 1 onto the substrate.

10. A method as in claim 9 for the administration of pharmaceuticals to a mammal including the step of ejecting an agglomeration of particles from said ink jet ink composition onto said mammal.

11. An ink jet ink comprising a liquid having an electrical resistance of at least $10^9$ ohm.cm, insoluble marking particles and a particle charging agent dispersed in the liquid, wherein said particles are capable of being charged and concentrated into agglomerations of the particles and ejected from the ink in an ink jet printing apparatus in the presence of electrostatic field of significant gradient.

12. An ink jet composition as in claim 1, which consists essentially of ingredients (a), (b), and (c).

13. A method as in claim 9 for the administration of pharmaceuticals onto a substrate including the step of ejecting an agglomeration of particles from said ink jet ink composition onto said substrate.

* * * * *